United States Patent
Ravichandran

(10) Patent No.: US 11,039,003 B2
(45) Date of Patent: Jun. 15, 2021

(54) CONTROLLING ROAMING BEHAVIORS OF MOBILE APPLICATIONS

(71) Applicant: T-Mobile USA, Inc., Bellevue, WA (US)

(72) Inventor: Vinod Ravichandran, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 8 days.

(21) Appl. No.: 16/515,724

(22) Filed: Jul. 18, 2019

(65) Prior Publication Data

US 2019/0342445 A1 Nov. 7, 2019

Related U.S. Application Data

(63) Continuation of application No. 15/680,170, filed on Aug. 17, 2017, now Pat. No. 10,397,393.

(51) Int. Cl.
*H04M 1/725* (2021.01)
*H04M 1/72454* (2021.01)
*H04W 8/18* (2009.01)
*H04W 8/06* (2009.01)
*H04W 4/02* (2018.01)
*H04M 1/72448* (2021.01)
*H04M 1/72463* (2021.01)
*H04W 8/12* (2009.01)

(52) U.S. Cl.
CPC ... *H04M 1/72454* (2021.01); *H04M 1/72448* (2021.01); *H04M 1/72463* (2021.01); *H04W 4/025* (2013.01); *H04W 8/06* (2013.01); *H04W 8/183* (2013.01); *H04W 4/02* (2013.01); *H04W 8/12* (2013.01)

(58) Field of Classification Search
CPC ......... H04W 4/02; H04W 4/025; H04W 8/06; H04W 8/183; H04M 1/72569; H04M 1/72577
USPC ..... 455/32.1, 432.2, 433, 435.1–2, 436–439, 455/3.04, 403, 428; 370/331–332
See application file for complete search history.

(56) References Cited

U.S. PATENT DOCUMENTS

| | | | |
|---|---|---|---|
| 9,485,711 B1 | 11/2016 | Ghoshal et al. | |
| 10,397,393 B2 | 8/2019 | Ravichandran | |
| 2006/0094423 A1 | 5/2006 | Sharma et al. | |
| 2009/0061854 A1* | 3/2009 | Gillot | H04W 24/00 455/432.1 |
| 2010/0291924 A1* | 11/2010 | Antrim | H04W 60/00 455/433 |
| 2012/0302204 A1* | 11/2012 | Gupta | H04M 15/70 455/406 |
| 2016/0050556 A1* | 2/2016 | Zhao | H04W 48/18 455/432.1 |
| 2016/0381547 A1* | 12/2016 | Jain | H04W 8/02 455/432.1 |
| 2017/0196027 A1* | 7/2017 | Hao | H04W 8/12 |

* cited by examiner

*Primary Examiner* — Congvan Tran
(74) *Attorney, Agent, or Firm* — Perkins Coie LLP

(57) ABSTRACT

Systems and methods are described herein for controlling the roaming behaviors of mobile applications, such as applications provided by mobile devices. In some embodiments, the systems and methods may determine that a mobile device is connected to a roaming network, and prompt or otherwise cause a user to authorize a mobile application to use the roaming network for sending and receiving data. Other details are provided herein.

19 Claims, 6 Drawing Sheets

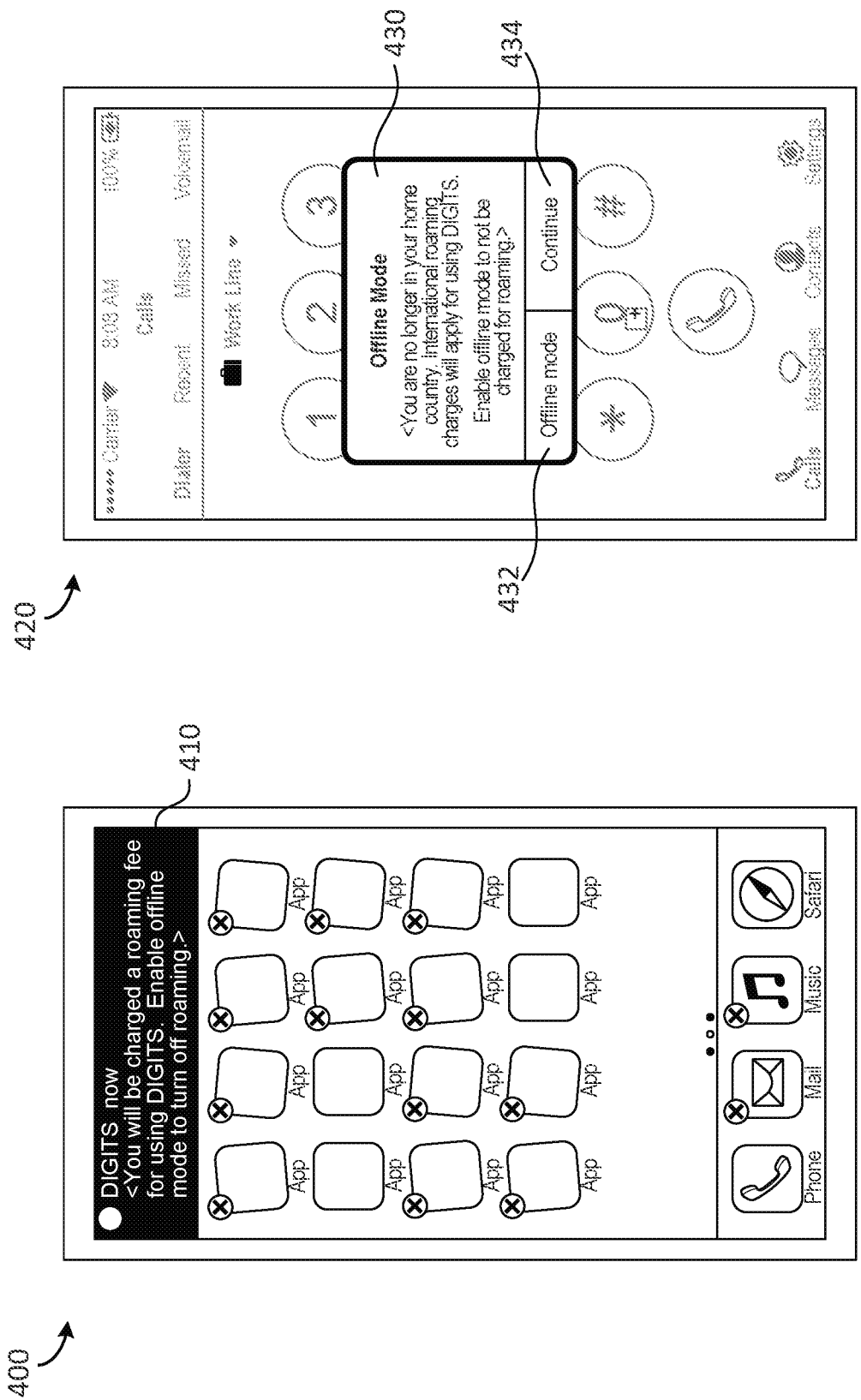

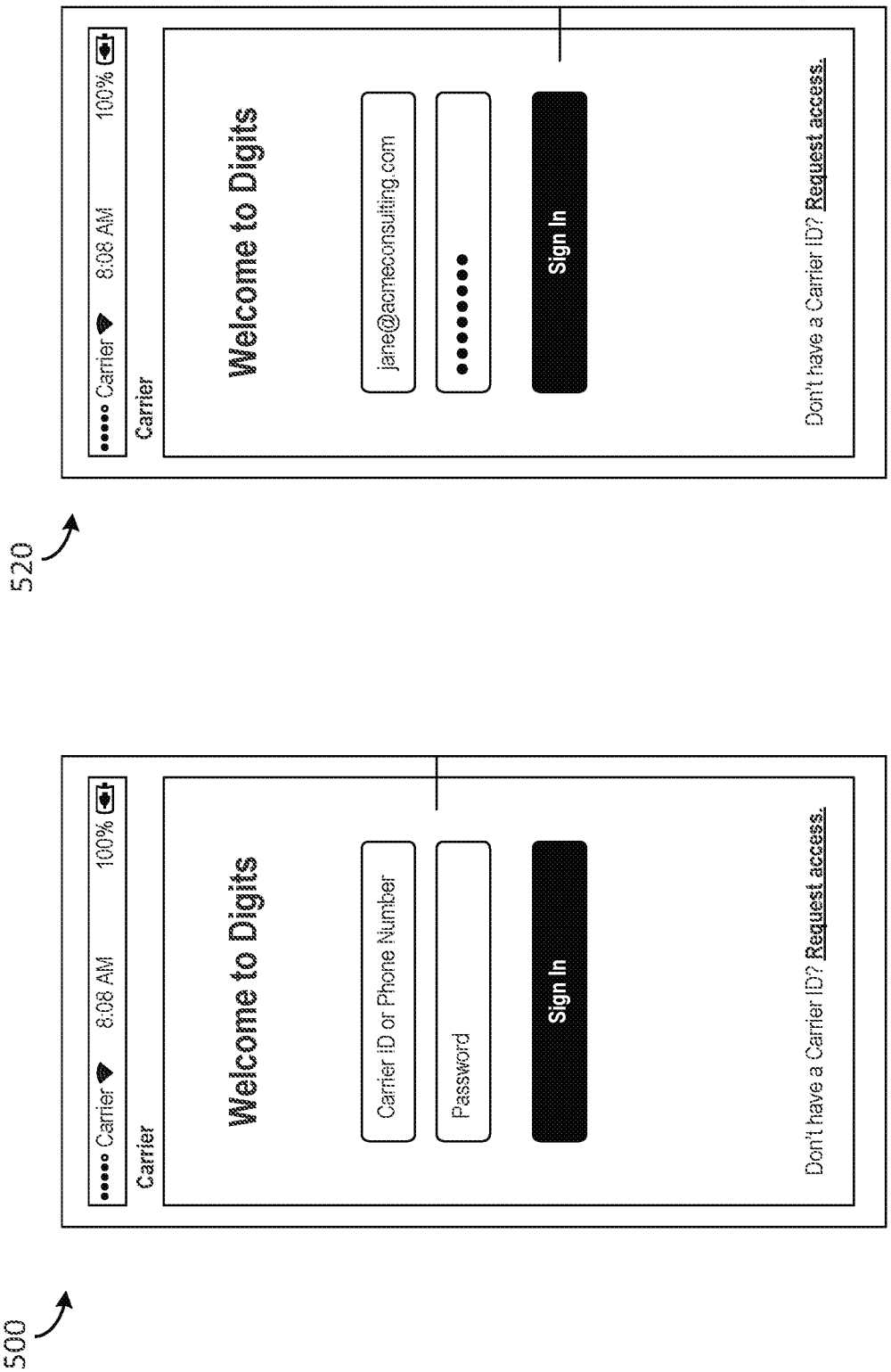

CONTROLLING ROAMING BEHAVIORS OF MOBILE APPLICATIONS

CROSS-REFERENCE TO RELATED APPLICATIONS

This application is a continuation of U.S. patent application Ser. No. 15/680,170, titled "CONTROLLING ROAMING BEHAVIORS OF MOBILE APPLICATIONS," filed Aug. 17, 2017; which is hereby incorporated by reference in its entirety.

BACKGROUND

A telecommunications network is established via a complex arrangement and configuration of many cell sites that are deployed across a geographical area. For example, there may be different types of cell sites (e.g., macro cells, microcells, and so on) positioned in a specific geographical location (e.g., a city, neighborhood, and so on), in order to provide adequate, reliable coverage for mobile devices (e.g., smart phones, tablets, and so on) via different frequency bands configured to provide different coverage types. The devices may seek access to the telecommunications network for various services provided by the network, such as services that facilitate the transmission of data over the network and/or provide content to the devices.

Mobile electronic devices (such as smart phones, personal digital assistants, computer tablets, and so on) are ubiquitous. Mobile devices provide advanced computing capabilities and services to users, such as voice communications, text and other messaging communications, video and other multimedia communications, streaming services, and so on. Often, users, via their mobile devices, access such services as customers or subscribers of telecommunications carriers, which provide telecommunications networks within which the users make voice calls, send text messages, send and receive data, consume content, and so on.

In some cases, a user may be in a geographical location that is only serviced or covered by visitor or roaming networks (e.g., networks other than a user's home network), such as when the user is in a foreign country or country where the user's home network does not operate.

In order to utilize services provided by the visitor network, the mobile device accesses the network by roaming, and the network provides services (e.g., data or voice communications) to the mobile device, despite the mobile device not being connected to its home network. Although such provision of services allows a user to access a network (via the roaming network), the roaming network often charges high fees to utilize the services. A user, therefore, may seek other alternatives to avoid paying the fees to use the roaming network, and/or not use his/her device at the location, among other drawbacks or inconveniences.

BRIEF DESCRIPTION OF THE DRAWINGS

Embodiments of the present technology will be described and explained through the use of the accompanying drawings.

FIGS. 4A-4B are display diagrams illustrating example user interfaces presented by a mobile device at a location associated with a roaming network.

FIGS. 5A-5C are display diagrams illustrating example user interfaces presented by a mobile application for provisioning the mobile application.

Figure 1:
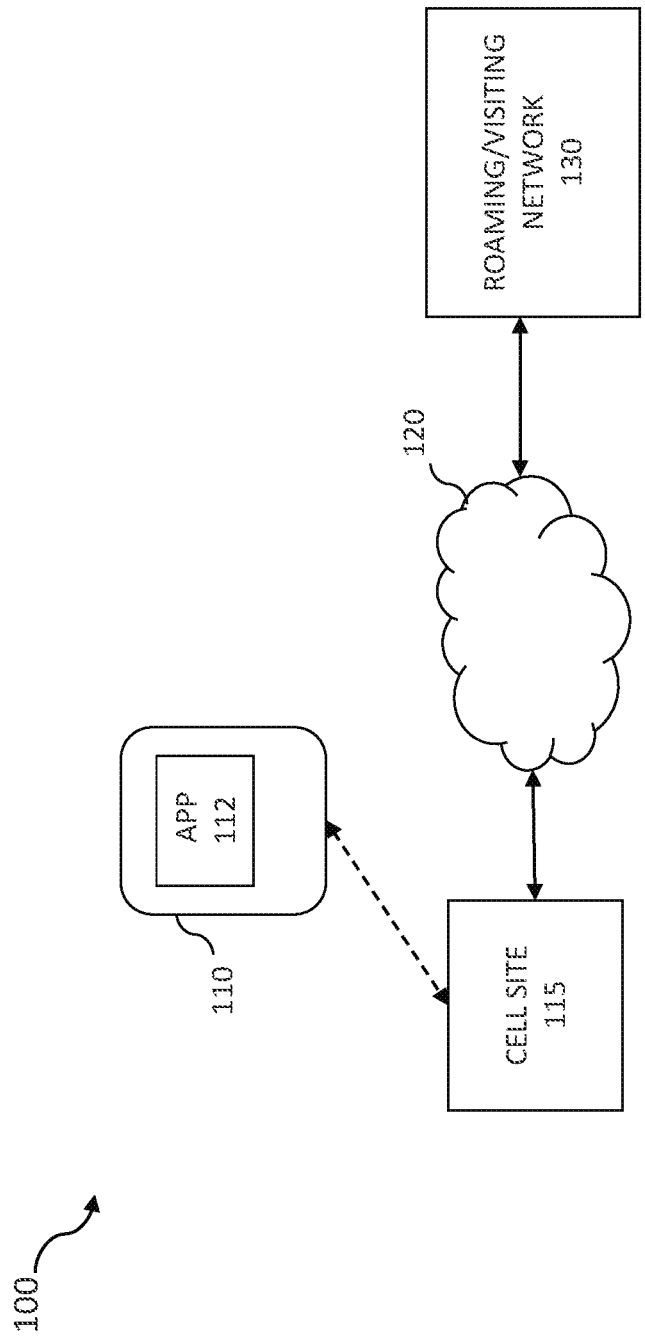
FIG. 1 is a block diagram illustrating a suitable computing environment for controlling roaming behaviors of mobile applications.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods are described herein for controlling the roaming behaviors of mobile applications, such as applications running and/or residing on mobile devices. When a mobile device (and associated user) enters or is at a geographical location, a mobile application receives notification of the location. The mobile application determines the location is associated with a roaming network (e.g., is not covered by a home telecommunications network of the mobile device).

The mobile device will often connect to the roaming network (unless the user turns off a radio of the mobile device). The mobile application, however, utilizing the systems and methods described herein, may not utilize the roaming network for services provided by the network (e.g., data or voice communications), unless authorization is received from the user of the mobile device. The systems and methods, therefore, facilitate the control and/or use of a roaming network at the mobile application level, to provide users with control of their specific network use, among other benefits.

For example, in some embodiments, the systems and methods facilitate selection of one or more operation modes of the mobile application. The systems and methods receive an indication that a mobile device containing the mobile application is at a geographical location outside of a home telecommunications network that includes a user associated with the mobile device as a subscriber of a carrier providing the home telecommunications network. Next, the systems and methods determine a visitor telecommunications network available to the mobile device at the geographical location is a roaming network with respect to the visitor telecommunications network providing data or voice communication services to the mobile device.

The systems and methods may then cause the mobile device to present multiple user-selectable options associated with an operation mode of the mobile application. A first option, when selected, causes the mobile application to remain online and perform communication operations over the visitor telecommunications network. A second option, when selected, causes the mobile application to move offline with respect to the visitor telecommunications network, and adjust the operation mode of the mobile application based on input received from the user of a selection of one of the multiple user-selectable options.

Thus, in some embodiments, the mobile application may include a location module that receives an indication that a mobile device containing the mobile application located geographical outside of a user's home telecommunications network. The mobile application includes a network module that determines a visitor telecommunications network available to the mobile device at the geographical location is a roaming network that can provide data or voice communication services to the mobile device.

Further, the mobile application includes an operation module that causes the mobile device to present multiple user-selectable options associated with an operation mode of the mobile application. The options may include a first option that, when selected, causes the mobile application to remain online and perform communication operations over the visitor telecommunications network, and a second option that, when selected, causes the mobile application to move offline with respect to the visitor telecommunications network. The operation module then adjusts or modifies the operation mode of the mobile application based on input received from the user of a selection of one of the multiple user-selectable options.

As another example, the systems and methods may determine that a mobile device is connected to a roaming network, and prompt or otherwise cause a user to authorize the mobile application to use the roaming network for sending and receiving data. Thus, the systems and methods, in some embodiments, proactively request users to authorize a mobile application's use of a roaming network before enabling such use. As described herein, controlling a mobile application's behaviors when an associated device is connected to a roaming network facilitates user awareness of when they are to be charged for use of the roaming network's services, such as the use of costly data or voice services, among other benefits.

In the following description, for the purposes of explanation, numerous specific details are set forth in order to provide a thorough understanding of embodiments of the present technology. It will be apparent, however, that embodiments of the present technology may be practiced without some of these specific details.

Examples of Suitable Telecommunications Networks

As described herein, in some embodiments, the systems and methods facilitate the control of mobile application behaviors and/or functionality when a mobile device (e.g., smart phone, tablet, laptop, and so on) providing the mobile application is connected to a visitor or roaming network. FIG. 1 is a block diagram illustrating a suitable computing environment 100 for controlling roaming behaviors of mobile applications.

A mobile device 110, or user equipment (UE), associated with a user, receives and transmits data, streams content, and/or performs other communications or receives services over a telecommunications network 120, which is accessed by the mobile device 110 over various access points, such as a cell site 115. For example, a user of the mobile device 110 may stream or otherwise receive content via one or more mobile applications 112 provided, supported, and/or otherwise resident on the device 110.

Example applications includes email or other messaging applications, carrier-provided applications (e.g., Digits™ from T-Mobile®) that integrate a subscriber's operations over their home network, various entertainment applications that stream content (e.g., multimedia content, such as video, images, audio, gaming, and so on) to the device 110, voice or video chat applications, social media applications, and other applications that update in the background and/or consume comparatively large amounts of data.

The cell site 115 may include macro cell sites, such as base stations, small cell sites, such as picocells, microcells, or femtocells, and/or other network access component or sites. The cell site 115 may store data associated with its operations, including data associated with the number of types of connected users, data associated with the provision and/or utilization of a spectrum, radio band, frequency band, and so on, provided by the cell site 115, and so on.

In some cases, such as when the mobile device is in a foreign country (e.g., a country that is not the home country of the mobile device), the mobile device 110 accesses a network 120 provided by a carrier of which the user of the mobile device is not a subscriber. In such cases, the mobile device 110 roams or otherwise receives communications services from a roaming or visiting network 130.

For example, a user associated with a U.S. telecommunications network may travel to Europe, where a European carrier provides a telecommunications network at a location of the user's mobile device. The European network is the roaming network 130 for the U.S. device. As another example, a resident of China travels to Germany for work, and communicates over a German network by roaming on the network.

FIG. 1 and the discussion herein provide a brief, general description of a suitable computing environment 100 in which controlling roaming behaviors of mobile applications can be supported and implemented. Although not required, aspects of the systems and methods are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the mobile device 110 and/or the cell site 115 may include network communication components that enable the devices to communicate with remote servers or other portable electronic devices by transmitting and receiving wireless signals using a licensed, semi-licensed, or unlicensed spectrum over communications network, such as network 120. In some cases, the communication network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network 120 may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications network. Thus, the user device is configured to operate and switch among multiple frequency bands for receiving and/or transmitting data.

Examples of Controlling Roaming Behaviors of Mobile Applications

Figure 2:
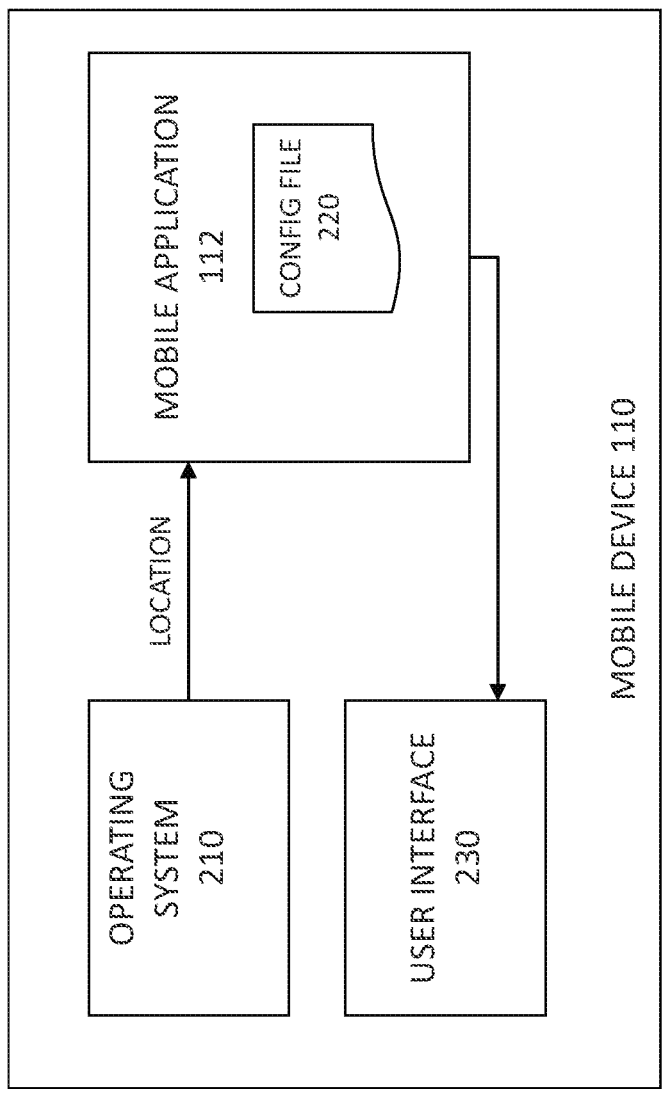
FIG. 2 is a block diagram illustrating components of a mobile device for controlling roaming behaviors of mobile applications.

As described herein, a mobile application may include various components that facilitate control of the application's behavior and/or functionality when a mobile device is connected to a roaming network (and not a home network). FIG. 2 is a block diagram illustrating components of a mobile device for controlling roaming behaviors of mobile applications.

The mobile application 112 may include functional modules that are implemented with a combination of software (e.g., executable instructions, or computer code) and hardware (e.g., at least a memory and processor). Accordingly, as used herein, in some examples a module is a processor-implemented module or set of code and represents a computing device having a processor that is at least temporarily configured and/or programmed by executable instructions stored in memory to perform one or more of the particular functions that are described herein.

When a user and his/her mobile device 110 enter a foreign country or other geographical location outside of a range or coverage area provided by the user's home telecommunications network, the mobile application 112 receives location information from an operating system 210 of the mobile device 110.

The operating system 210, for most mobile devices, includes various location services components configured to determine a geographical location of a mobile device. For example, the operating system 210 may obtain location information from various wireless access points to which a mobile device may communicate (via associated IP addresses, among other information). As another example, the operating system 210 may obtain the information from GPS components within the mobile device.

The mobile application 112 receives the geographical location from the operating system 210, and provides the information to one or more configuration files 220 stored within and/or accessed by the mobile application 112. The configuration file 220 may include various tables or data structures that relate country codes (and other location identifiers) to rate plans, roaming charges for various services, text to presented to a user, and so on.

An example configuration file 220 is depicted as follows:

```
<home_country>
    <country id="1" type="alpha2">US</country>
    <country id="2" type="alpha2">MX</country>
    <country id="3" type="alpha2">HR</country>
<!-- <country id="3" type="alpha2">CA</country> -->
</home_country>
<high_data_charge_countries>   <!--These are countries that are not in the
Simple Global plan -->
    <country id="1" type="alpha2">LB</country>
    <country id="2" type="alpha2">LK</country>
    <country id="3" type="alpha2">ZW</country>
    <country id="4" type="alpha2">LT</country>
</high_data_charge_countries>
<high_data_charge_warning>   <!--Consent warning for countries that are not
in the Simple Global plan -->
<data_warning><![CDATA[Warning: You are roaming in a country that is not
part of your T-Mobile plan. This Application can consume large amounts of
data. Text, Picture messaging, calls, and data syncing all consume the phones
data. This could become extremely expensive. Are you sure you want to
continue?]]></data_warning>
</high_data_charge_warning>
```

Thus, as depicted, the configuration file 220 may include various instructions or information, including information that relates a country code to associated data charges (e.g., normal charges, roaming changes, high data charge roaming, and so on), to descriptive information to be presented to users, and so on.

Using information provided by the configuration file 220, the mobile application 112 may then render and provide information, via a user interface 230 of the device 110, associated with one or more user-selectable options to be presented to the user of the device 110. The options may facilitate the selection of various operation modes of the application 112, such as an offline mode, where the application 110 does not send or receive data over the roaming network 130.

For example, in offline mode, the mobile application 110 stops any synchronization or timer operations, because they require communicating over the roaming network 130 in order to receive updates and other data. Further, the application 110 may then only provide users with pages displayed in read only mode and/or pages that function to provide content already transmitted to the device 110.

Thus, in some embodiments, a mobile application may utilize location information from the operating system 210 of the mobile device 110 to determine the device 110 is on a roaming network (e.g., outside of a home network). Then, the application selectively and/or automatically prevents certain operations (e.g., synching, streaming, and so on) normally performed by the mobile application 112, such as operations performed in the background, while roaming, until a user authorizes such functionality.

Figure 3:
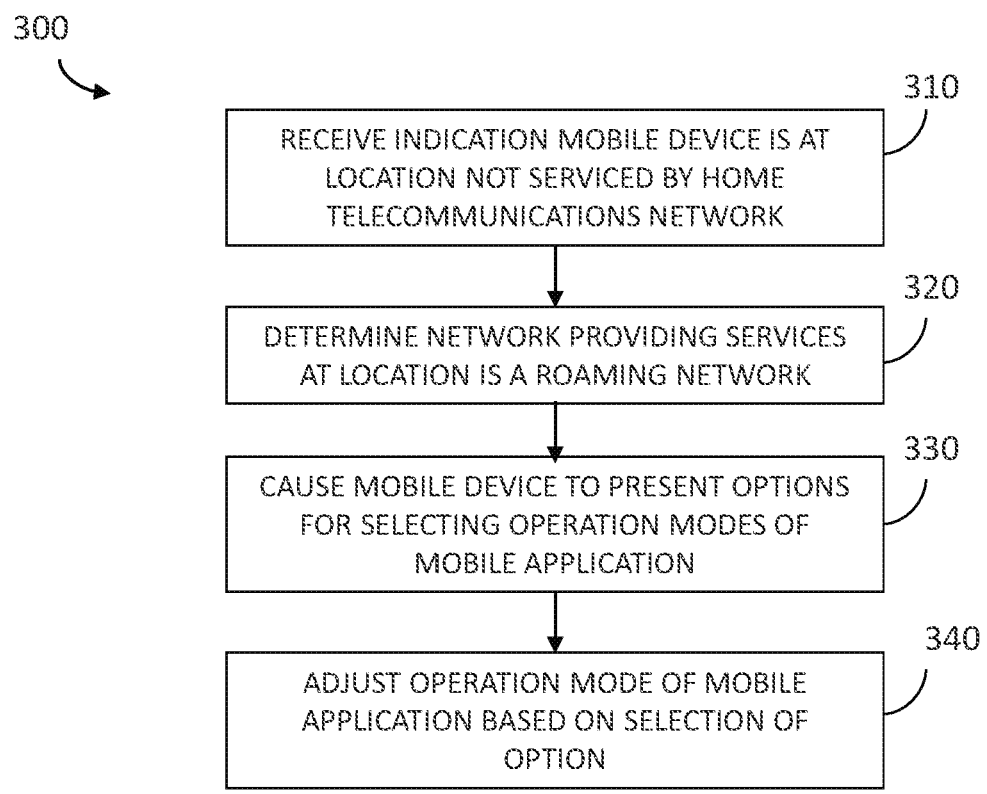
FIG. 3 is a flow diagram illustrating a method for facilitating selection of an operation mode of a mobile application.

The systems and methods, therefore, performs various operations, methods, or processes for controlling roaming behaviors of mobile applications connected to a roaming network, such as a network when the mobile device 110 is located in a foreign country. FIG. 3 is a flow diagram illustrating a method 300 for facilitating selection of an operation mode of a mobile application. The method 300 may be performed by the mobile application 112 and, accordingly, is described herein merely by way of reference thereto. It will be appreciated that the method 300 may be performed on any suitable hardware.

In operation 310, the mobile application 112 receives an indication that the mobile device 110 containing the mobile application 112 is at a geographical location outside of a home telecommunications network. The home network may include a user associated with the mobile device 110 as a subscriber of a carrier providing the home telecommunications network. The mobile application 112 may receive the information from the operating system 210 of the mobile device 110.

In operation 320, the mobile application 112 determines a visitor telecommunications network available to the mobile device 110 at the geographical location is a roaming network with respect to the visitor telecommunications network providing data or voice communication services to the mobile device. For example, the mobile application 112 may provide the geographical location to a configuration file associated with the mobile application, such as the configuration file 220 that maps country codes associated with geographical locations to roaming services providing by roaming networks servicing the geographical locations, and identifies or determines the visitor telecommunications network as the roaming network based on information provided by the configuration file.

In operation 330, the mobile application 112 causes a user interface of the mobile device to present multiple user-selectable options associated with an operation mode of the mobile application. In some cases, the user-selectable options include:

a first option that, when selected, causes the mobile application to remain online and perform communication operations over the visitor telecommunications network;

a second option that, when selected, causes the mobile application to move offline with respect to the visitor telecommunications network; and/or a third option that, when selected, causes the mobile application to initiate a process on behalf of the user to adjust a subscription to the carrier for the user, where the adjusted subscription includes a temporary international roaming service plan that is added to the subscription to the carrier for the user.

As described herein, when a user selects the second option (or, in some cases, when the application 112 automatically moves offline), the application 112 may operate in the offline mode, as follows:

The application 112 may send a signal to the home telecommunications network to stop communicating with the mobile application over any network;

The application 112 may stop performing syncing operations over a network or performing timing operations over a network;

The application 112 may only present read only pages to the user that were previously rendered by the mobile application and/or only provide content already stored by the device 110; and so on.

When presenting the options to the user to authorize use of the mobile application 112 over the roaming network 130, the application 112 may present different types or information to the user, such as price information associated with the mobile device receiving data over the roaming network 130, rate plan information associated with adding a roaming rate plan to the user's telecommunications subscription, and so on.

FIGS. 4A-4B are display diagrams illustrating example user interfaces presented by a mobile device at a location associated with a roaming network. FIG. 4A depicts a home screen 400 of the mobile device 110. When the mobile device 110 is connected to the roaming network 130 or otherwise located outside of a home telecommunications network, the application 112, via the home screen, presents a roaming notification 410 that indicates use of the application 112 will lead to roaming charges.

FIG. 4B depicts an "in app" mode interface 420, where a user is utilizing or launches the mobile application 112 while connected to the roaming network 130. As shown, once the application 112 is launched, the application 112 presents a notification, along with various user-selectable options, that provide information regarding use of the roaming network 130 and facilitate the user selection an option 434 to continue use of the application while roaming and/or an option 432 to move to offline mode. Of course, the mobile application 112 may present other information or interface elements configured to inform users they are roaming and facilitate user control of the operation mode of the mobile application.

Returning to FIG. 3, in operation 340, the mobile application 112 adjusts or modifies the operation mode of the mobile application 112 based on input received from the user of a selection of one of the multiple user-selectable options.

In some embodiments, the mobile application 112, may receive an indication that the mobile device 110 has moved to a geographical location serviced by the home telecommunications network, and readjust or modify the operation mode of the mobile application 112 back to a home network operation mode (e.g., where all services are provided via the application).

Thus, as described herein, the systems and methods determine that a mobile device is connected to a roaming network, and prompt or otherwise cause a user to authorize the mobile application to use the roaming network for sending and receiving data, before continuing use of the application. As described herein, various different applications, in addition to carrier or network-associated applications, may provide such functionality.

Figure 5C:
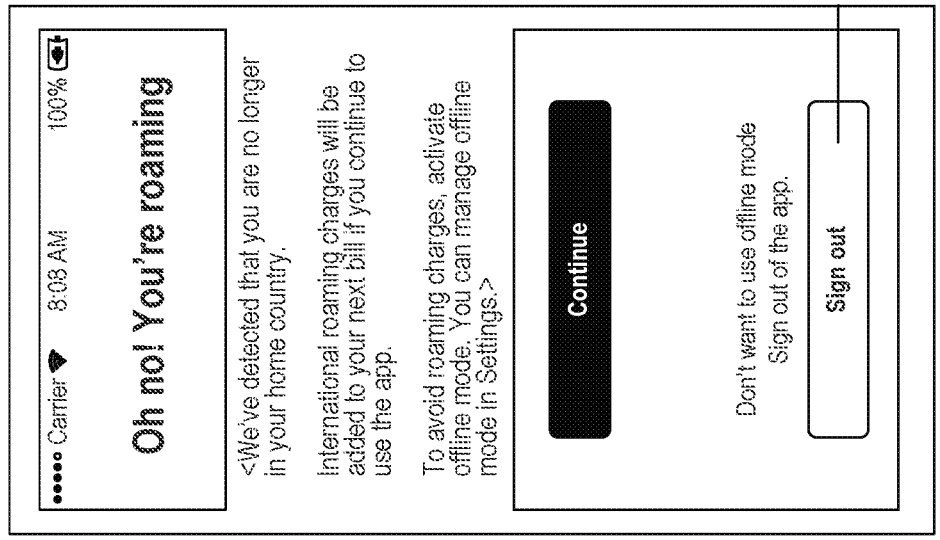

The installation of an application, and various use cases associated with an application, will now be described. FIGS. 5A-5C are display diagrams illustrating example user interfaces presented by a mobile application for provisioning the mobile application.

As depicted in user interfaces 500 and 510 of FIGS. 5A and 5B, respectively, when a user logs in, the application 112 fetches location information and a configuration file (which provides country codes in a home country field). If the country is Home, the application launches as normal. If the country is not a home country, the application presents interface 520 of FIG. 5C, which presents user-selectable options, as described herein.

When a user is logged in and outside of the application, the application shows a local notification of roaming, receiving the notification text from the configuration file 220. Once a user clicks on the notification, the application causes display of a pop-up element having various user-selectable options, including additional text from the configuration file 220.

As described herein, when the user selects offline mode, the application 112 goes offline, by stopping some or all signaling, and only providing read only views of presented screens or pages. When the user selects continue, the application 112 performs normal operation.

When a user is within the application 112, the application 112 presents the pop-up element upon detection of a different, non-home location or country, and continues operation based on user selections described herein.

When a user is within an application and the application is in an offline mode, the application may be running a timer associated with a check or review of whether the device has moved back to a home network. When the timer expires, the application checks a current location by retrieving location information from the operating system 210, and proceeds as describe herein.

The mobile application 112, therefore, may automatically monitor its location, even in offline mode, in order to switch between operation modes as the mobile device moves between home and foreign countries, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. At least one non-transitory, computer-readable medium, carrying instructions, which when executed by at least one data processor, performs operations to facilitate selection of at least one operation mode of a mobile application on a mobile device, the operations comprising:
   receiving an indication that the mobile device is connectable to a roaming telecommunications network,
      wherein the roaming telecommunications network is capable of providing data or voice communication services to the mobile device;
   causing the mobile device to present at least one user-selectable option associated with an operation mode of the mobile application after receiving the indication that the mobile device is connectable to the roaming telecommunications network,
      wherein the at least one user-selectable option includes:
         an option that, when selected, causes the mobile application to (i) move offline with respect to the roaming telecommunications network, or (ii) prevent the mobile application from performing syncing or timing operations over the roaming telecommunications network; and
   adjusting the operation mode of the mobile application based on input received to select the at least one user-selectable option.

2. The computer-readable medium of claim 1, further comprising:
   receiving an indication that the mobile device has moved to a geographical location serviced by a home telecommunications network for the mobile device; and
   re-adjusting the operation mode of the mobile application to a home network operation mode.

3. The computer-readable medium of claim 1, further comprising receiving, from an operating system of the mobile device, an indication of a geographical location; and
   providing the geographical location to a configuration file associated with the mobile application,
      wherein the configuration file maps country codes associated with geographical locations to roaming services providing by roaming networks servicing the geographical locations; and
   identifying the roaming telecommunications network based on information provided by the configuration file.

4. The computer-readable medium of claim 1, wherein the least one user-selectable option includes another option that, when selected, causes the mobile application to initiate a process to adjust a subscription to a carrier for the mobile device,
   wherein the adjusted subscription includes a temporary international roaming service plan that is added to the subscription to the carrier for the mobile device.

5. The computer-readable medium of claim 1, further comprising presenting price information associated with the mobile device receiving data over the roaming telecommunications network.

6. The computer-readable medium of claim 1, wherein the mobile application is an application associated with a carrier providing a home telecommunications network for the mobile device.

7. The computer-readable medium of claim 1, wherein the mobile application provides multimedia content streamed over a network to the mobile device.

8. The computer-readable medium of claim 1, wherein the option causes the mobile application to move into an offline mode by sending a signal to a home telecommunications network to stop communicating with the mobile application.

9. The computer-readable medium of claim 1, wherein the option causes the mobile application to move into an offline mode that enables the mobile application to only present read only pages to the user that were previously rendered by the mobile application.

10. A computer-executable method that facilitates selection of one or more operation modes of a mobile application, the method comprising:
    receiving an indication that a mobile device is connectable to a roaming telecommunications network,
       wherein the roaming telecommunications network is capable of providing data or voice communication services to the mobile device;
    causing the mobile device to present at least one user-selectable option associated with an operation mode of the mobile application after receiving the indication that the mobile device is connectable to the roaming telecommunications network,
       wherein the at least one user-selectable option includes:
          an option that, when selected, causes the mobile application to (i) move offline with respect to the roaming telecommunications network, or (ii) prevent the mobile application from performing syncing or timing operations over the roaming telecommunications network; and
    adjusting the operation mode of the mobile application based on input received to select the at least one user-selectable option.

11. The method of claim 10, further comprising receiving an indication that the mobile device has moved to a geographical location serviced by a home telecommunications network for the mobile device; and re-adjusting the operation mode of the mobile application to a home network operation mode.

12. The method of claim 10, further comprising: receiving, from an operating system of the mobile device, an indication of a geographical location; and
    providing the geographical location to a configuration file associated with the mobile application,
       wherein the configuration file maps country codes associated with geographical locations to roaming services providing by roaming networks servicing the geographical locations; and
       identifying the roaming telecommunications network based on information provided by the configuration file.

13. The method of claim 10, wherein the least one user-selectable option includes another option that, when selected, causes the mobile application to initiate a process to adjust a subscription to a carrier for the mobile device, and wherein the adjusted subscription includes a temporary international roaming service plan that is added to the subscription to the carrier for the mobile device.

14. The method of claim 10, wherein the mobile application is an application associated with a carrier providing a home telecommunications network for the mobile device.

15. The method of claim 10, wherein the mobile application provides multimedia content streamed over a network to the mobile device.

16. The method of claim 10, wherein the option causes the mobile application to move into an offline mode that enables the mobile application to only present read only pages to the user that were previously rendered by the mobile application.

17. A system to cause a mobile application to adjust operations, the system comprising:
- at least one memory carrying instructions;
- at least one hardware processor, coupled to the memory and executing the instructions, the instructions comprising:
  - receiving an indication that a mobile device is connectable to a roaming telecommunications network, wherein the roaming telecommunications network is capable of providing data or voice communication services to the mobile device;
  - causing the mobile device to present at least one user-selectable option associated with an operation mode of the mobile application after receiving the indication that the mobile device is connectable to the roaming telecommunications network,
    wherein the at least one user-selectable option includes:
    - an option that, when selected, causes the mobile application to (i) move offline with respect to the roaming telecommunications network, or (ii) prevent the mobile application from performing syncing or timing operations over the roaming telecommunications network; and
  - adjusting the operation mode of the mobile application based on input received to select the at least one user-selectable option.

18. The system of claim 17, wherein the mobile application is an application associated with a carrier providing a home telecommunications network for the mobile device.

19. The system of claim 17, wherein the roaming network is an international network providing communications services to the mobile device.

* * * * *